United States Patent Office 2,791,601
Patented May 7, 1957

2,791,601

CO-ORDINATED PRIMARY AMINE METAL COMPLEXES

Maynard B. Unger and Edward R. Schwab, Chicago, Ill., assignors to The Sherwin-Williams Company, Cleveland, Ohio, a corporation of Ohio No Drawing. Application May 5, 1953,
Serial No. 353,231

9 Claims. (Cl. 260—463)

This invention relates to novel magnesium and aluminum complex salts of primary amines and their preparation.

More particularly, this invention relates to co-ordination compounds of a primary amine, magnesium or aluminum ion, methylate and methoxy carbonate formed by reacting aluminum or magnesium metal with methanol and subsequently with a primary amine in the presence of a gaseous stream of carbon dioxide.

Specifically, this invention relates to co-ordination compounds formed by reacting aluminum or magnesium metal with methanol and subsequently with a primary rosinamine in the presence of carbon dioxide.

Analytical investigation has shown the nature of the complex salts formed to be dependent upon the relative ratios of reactants condsensed. That co-ordination compounds may be formed at room temperature by combining methanolic solutions of a primary rosinamine and metallic methyl carbonate, e. g., magnesium or aluminum is hereinafter shown in greater detail. Co-ordination compounds have been prepared having a primary rosinamine to metal methoxy carbonate molecular ratios of 4:1, 3:1, 2:1 and 1:1. Those of higher ratio than 1:1 were found to be less stable upon heating than the 1:1 ratio product. These co-ordination complexes have been found to have particular merit in their application to the formulation of protective and decorative coatings, particularly in respect to their aid in increasing the gloss of pigmented finishes.

The novel co-ordination complexes of salt-like nature are believed represented generically by the following structural formula:

where:

R is a primary residue,
M is magnesium or aluminum,
y is a whole number including one through four,
When M is aluminum, x is a value of 2 to 3 and when M is magnesium, x is a value of 0 to 2.
z is the valence of the metal cation M,
v is the number of positive charges associated with the cation and is equivalent in numerical value to z.

The value of x approaches the value of z upon heating the complex. Heating liberates $CO_2$ and the effective value of x thereby increases. The most heat stable form of the generic compound is formed where x is equal in value to z.

The metal of the cation is bonded to the nitrogen atom through the unshared electron pairs of the nitrogen. The number of positive charges associated with the cation is 2 in the case of magnesium and 3 in the case of aluminum.

Considerable experimentation has shown that the procedure for manufacture of the primary amine complexes may be varied. The mechanism involved in the formation of the herein described and claimed metal complexes is believed to accord with the following steps, but not essentially in the exact order as presented. Magnesium is used as illustrative, but aluminum has demonstrated analogous behavior with exceptions as will be pointed out later.

Step 1.—Methylate formation:

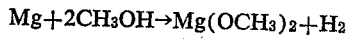

Step 2.—Formation of magnesium methoxy carbonate:

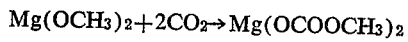

(This compound is unstable, but has been isolated.)

Step 3.—Co-ordination with the primary amine:

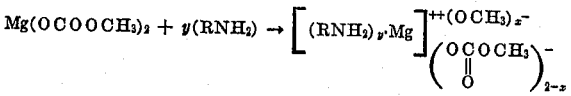

where y is a whole number not greater than 4 and x is a figure from 0 to not exceeding 2, the valency of magnesium.

Among the primary amines found useful for the purposes of this invention, primary rosinamines have been of the greatest interest. However, other high molecular weight amines having more than eight carbon atoms including hexadecylamine, octadecenylamine and octadecadienylamine in admixture with other amines of similar aliphatic nature, as obtained from commercial sources, produce similar co-ordinated complexes by methods analogous to those herein described. The complexes described have been successfully employed as addition agents in paint compositions as well as unpigmented oils and varnishes.

In pigmented coatings, the complexes described have been found to increase the gloss level of the dry coatings and in the case of oils and varnishes have materially increased the viscosity of the clear liquids in bulk form.

The effect of the co-ordinated complexes described upon gloss of films may be attributed to the strongly polar methoxide groups as well as the solubility of the hydrocarbon residue of the primary amine. The solubility effect of the rosin residue upon organic vehicles used as varnishes as well as its compatibility with a diversity of coating compositions is the principal reason for its preference for the purposes of this invention. The letter R as used herein refers broadly to an organic residue having at least eight carbon atoms. The corresponding acid

is soluble in oleoresinous varnishes and insoluble in water.

The term "rosinamine" is here used in a generic sense and is meant to include compounds of structure similar to amino-dimethyl isopropyl phenanthrene having minor differences in substituents and varying degrees of unsaturation. Compounds within the scope of the term are limited to primary rosinamines, i. e., R—$NH_2$. Rosinamines may be prepared from abietic acid, wood rosin, gum rosin, dehydrogenated rosin, disproportionated rosin, hydrogenated rosin, etc. In one method of preparation, the nitrile derivative of rosin is hydrogenated to the amine. Methods of manufacture of rosinamines have been described elsewhere in the chemical art in greater detail.

The following illustrative examples and tables, along with comments thereon, will, it is believed, set forth sufficient directions to enable one skilled in the art to practice the invention and to understand the establishment of the general structure of the co-ordinated complexes formed. With minor differences, aluminum and magnesium have been found to form analogous co-ordinated compounds and the illustrative material is therefore confined to magnesium except where comment on differences observed has been noted.

EXAMPLE 1

48 g. magnesium ribbon
Trace mercuric chloride were placed in an externally cooled reaction vessel equipped with thermometer, agitator, reflux condenser and dropping funnel.

400 g. anhydrous methyl alcohol were added dropwise and with caution. After the entire amount of alcohol was added and reflux had subsided 640 g. rosinamine were added, external heat was employed to bring the temperature to 160° F. or gentle reflux, and the fluid sparged with carbon dioxide for six hours maintaining the temperature. The reflux condenser was removed, excess alcohol removed by continued heating and blowing with $CO_2$ and the reaction mass poured out at 480° F. Upon grinding the cooled solid, a fine white powder was obtained.

EXAMPLE 2

In equipment and in a manner similar to Example 1, 12 g. aluminum foil
Trace $HgCl_2$ were reacted with 200 g. anhydrous methyl alcohol, added by dropwise addition.

After heat of reaction had subsided, 480 g. rosinamine were added to the reaction mass and the temperature maintained at reflux for six hours with gentle blowing of carbon dioxide through the reaction mixture. Excess methyl alcohol was thereafter distilled off and a white powder recovered from the residue.

The products of Examples 1 and 2 were thereafter employed in several paint formulas, by inclusion of 1–5% in the grind (pigment plus portion of vehicle) portion. The gloss and flow characteristics of the paint were improved remarkably. Crawling was eliminated in certain enamels which had previously given trouble with crawling due to their poor wetting characteristics.

It was also found that small percentages (e. g., 1–10%) of these salts had a very marked acceleration effect upon the bodying rate of drying oils. With soya oil, embodying with 5% of the magnesium complex for 7½ hours at 440–460° F. in the presence of $SO_2$ gave a body of U. Without the rosinamine complex under the same bodying conditions, a body of E was obtained.

EXAMPLE 3

A commercially available primary rosinamine (Rosinamine D, Hercules Powder Company) was vacuum stripped on a steam bath to assume removal of dissolved ammonia. The basic equivalent weight, determined by acidification and back-titration to bromothymol blue endpoint, was found to be 317. By nitrogen determination, the value was calculated to be 312.

Magnesium methylate was prepared as in the first stage of Example 1 by dropwise addition of 250 g. of dry reagent grade methanol to 24.3 g. magnesium turnings in the presence of 0.1 g. mercuric chloride.

A 317 g. (1 mol) aliquot of the vacuum stripped rosinamine was added to the formed magnesium methylate under reflux while blowing with 0.3 cu. ft./min. of $CO_2$. The reactants solidified to a white mass. The product was heated on an oil bath at 250° F. to remove excess methanol.

Keldjahl nitrogen determinations gave 3.03 and 3.06% N. which corresponds to a molecular weight of 432 per nitrogen atom. Magnesium determinations by ignition and conversion to magnesium ammonium phosphate monohydrate gave 5.78 and 5.88% magnesium.

| Rosinamine Complex | Molecular Weight Complex | | Magnesium | |
|---|---|---|---|---|
| | Calculated | Found | Calculated | Found |
| $Mg(OCH_3)_2:RNH_2$ | 403.3 | 432 | 6.02 | 5.8 |
| $Mg(OCH_3)_2:RNH_2:CO_2$ | 447.3 | | 5.44 | |
| $Mg(OCH_3)_2:RNH_2:2CO_2$ | 491.3 | | 4.92 | |

EXAMPLE 4

Repeat of Example 3, but nitrogen gas was substituted for $CO_2$. The product obtained was a sticky residue having totally different physical appearance and properties than the product obtained in the presence of $CO_2$. This experiment established that $CO_2$ was not an inert atmosphere but a necessary reactant.

EXAMPLE 5

A quantity of magnesium methylate was prepared by dissolving 6.08 g. of magnesium turnings in 100 g. of reagent methanol to produce a white slurry. Upon blowing $CO_2$ through the slurry, an exothermic reaction was observed to occur and the solution became clear. Blowing was continued an additional half hour. Thereafter 79 g. of prepared (stripped) rosinamine was added and a heavy white precipitate formed. The product was heated to 250° C. slowly and blown with nitrogen during the heating period. 107 g. of product were recovered.

EXAMPLE 6

Methyl magnesium carbonate was prepared as in Example 5 and diluted with anhydrous methanol to produce a 0.410 molar solution. The solution was standardized by precipitation of magnesium hydroxide, ignition and quantitative determination, gravimetrically, of magnesium oxide. The normality of the solution was confirmed by precipitation of the carbonate ion with barium at a pH of 8.0 to 9.0.

A 0.672 molar rosinamine solution in methanol was also prepared.

To a series of flasks containing 5 ml. ($2.05 \times 10^{-3}$ mols) of the 0.410 molar methyl magnesium carbonate were added (1) 3.06; (2) 6.12; (3) 9.18 and (4) 12.24 ml. respectively of the 0.672 molar rosinamine solution at 25° C.

The flasks were allowed to stand until precipitation of white material had ceased, cooled to 0° C., the precipitate quantitatively filtered off into sintered glass crucibles to give yields as noted in Table 1 below.

Table 1

| Exp. No. | Ml. Std. Amine Sol. | Ml. Std. Mg Sol. | Molar Ratio | Yield | | |
|---|---|---|---|---|---|---|
| | | | | Calculated | Found | Percent |
| 1 | 3.06 | 5 | 1:1 | 1.01 | 0.81 | 79.3 |
| 2 | 6.12 | 5 | 1:2 | 1.06 | 0.99 | 59.6 |
| 3 | 9.18 | 5 | 1:3 | 2.42 | 1.15 | 47.8 |
| 4 | 12.24 | 5 | 1:4 | 2.95 | 1.23 | 41.7 |

In the above, it was believed the order of addition of rosinamine to magnesium methyl carbonate did not favor the combinations higher than the 1:1 ratio. Upon reversing the order of addition, results were obtained as illustrated in Table 2. Here the expected co-ordination compounds were formed. The standard methyl magnesium carbonate solution was added in a single portion to the rosinamine solution.

F.). At this ratio the loss of $CO_2$ from the magnesium methyl carbonate upon co-ordination with rosinamine in each instance was found to be about 1.5 molecules, independent of the reaction temperature as shown in Table 4.

Table 4

| Exp. No. | Formula | Molecular Weight [1] | | Percent Magnesium | |
|---|---|---|---|---|---|
| | | Calculated | Found | Calculated | Found |
| 10 (249° C.) | Mg(OCH₃)₂:RNH₂ | 403.3 | [2] 432.0 | 6.02 | [3] 5.83 |
| | Mg(OCH₃)₂:RNH₂:CO₂ | 447.3 | | 5.44 | |
| | Mg(OCH₃)₂:RNH₂:2CO₂ | 491.3 | | 4.92 | |
| 11 (25° C.) | Mg(OCH₃)₂:RNH₂ | 403.3 | [4] 436.0 | 6.02 | [5] 5.75 |
| | Mg(OCH₃)₂:RNH₂:CO₂ | 447.3 | | 5.44 | |
| | Mg(OCH₃)₂:RNH₂:2CO₂ | 491.3 | | 4.92 | |

[1] Equivalent weight of rosinamine for calculated value of 317. Experimental values are based upon nitrogen analysis and corrected for the non-amine nitrogen content.
[2] This value is equivalent to a loss of 1.3 molecules of carbon dioxide from the Mg(OCH₃)₂:RNH₂:2CO₂ product.
[3] This value is equivalent to a loss of 1.7 molecules of carbon dioxide from the Mg(OCH₃)₂:RNH₂:2CO₂ product.
[4] This value is equivalent to a loss of 1.3 molecules of carbon dioxide from the Mg(OCH₃)₂:RNH₂:2CO₂ product.
[5] This value is equivalent to a loss of 1.5 molecules of carbon dioxide from the Mg(OCH₃)₂:RNH₂:2CO₂ product.

Table 2

| Exp. No. | Ml. Std. Amine Sol. (1.27 molal) | Ml. Std. Mg Sol. (1.645 molal) | Molar Ratio | Yield | | |
|---|---|---|---|---|---|---|
| | | | | Calculated | | Found |
| | | | | $a^2$ | $b^3$ | |
| 5 | 13.0 | 10 | 1:1 | 8.07 | 7.37 | 7.35 |
| 6 | 26.0 | 10 | 1:2 | 13.28 | 12.52 | 12.56 |
| 7 | 39.0 | 10 | 1:3 | 18.51 | 17.87 | 17.82 |
| 8 | 52.0 | 10 | 1:4 | 23.70 | 22.86 | 22.96 |
| 9 | 78.0 | 10 | 1:6 | c | c | c |

$a^2$. Assumes direct combination without loss of $CO_2$.
$b^3$. Assumes direct combination with one mol of $CO_2$ lost.
c. Two phases developed: a white solid phase and a yellow liquid phase.

Table 3

| Exp. No. | Molar Ratio | Decomposition Point, ° C. |
|---|---|---|
| 5 | 1:1 | 200 |
| 6 | 1:2 | 135 |
| 7 | 1:3 | 110 |
| 8 | 1:4 | 90 |
| 9 | 1:6 | |

The data obtained in Tables 2 and 3, above, indicate that compounds showing the full co-ordination number of four of the magnesium ion are stable up to about 90° C. The yields obtained correspond almost exactly to the loss of one molecule of $CO_2$ in the various co-ordination compounds from the 1:1 to 1:4 molar ratio of rosinamine to methyl magnesium carbonate.

From the data presented in Table 3, it is to be observed that increasing thermal stability is exhibited by compounds formed of lower molar ratio. Separation into two distinct phases as observed in Experiment 9 is indicative of an excess of rosinamine over the maximum combining molar ratio of 4:1 and tends to confirm the co-ordination theory.

It is to be noted that heating as in Examples 1 and 2 may be sufficient to drive off $CO_2$. Magnesium methyl carbonate itself is not a stable compound as was observed by liberation of carbon dioxide from a standard methanolic solution. The solid decomposes rapidly at 110° C. To investigate the effect of temperature of formation upon composition, magnesium-rosinamine complexes were formed at 1:1 molar ratios at 25° and at 249° C. (480°

Further evidence that the products formed at 1:1 molar ratios under high and low temperature conditions are subject to loss of carbon dioxide is found in the fact that after 60 hours at 110° C. both products lost 6.9% by weight. This corresponds to a loss of all the chemically bound carbon dioxide to yield a composition of the structure $$[RNH_2 \cdot Mg]^{++}(OCH_3)_2^{--}$$

where R is a rosin residue.

With magnesium metal, the reaction is believed to accord with the following steps:

$$Mg + 2CH_3OH \rightarrow Mg(OCH_3)_2 + H_2$$

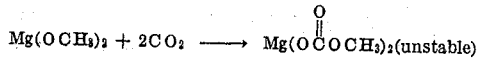

where $y$ is a whole number including 1 through 4.

The data shown in Table 4 indicates that the ratio of $(OCH_3)^-$ and

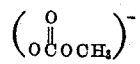

ions may vary, the most stable form represented by the general structure:

$$[(RNH_2)_y \cdot Mg]^{++}(OCH_3)_2^-$$

where $y$ is a whole number not greater than 4 and R is a rosin residue.

The aluminum complexes of rosinamine are analogous to the magnesium complexes described above with the exception that in the reaction between aluminum methylate and carbon dioxide only one alkoxide group is attacked as shown:

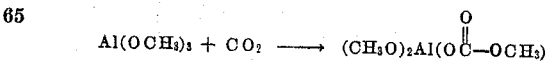

Upon co-ordination of the aluminum methoxy carbonate with rosinamine, a similar co-ordination complex is formed with some loss in $CO_2$.

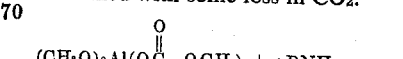
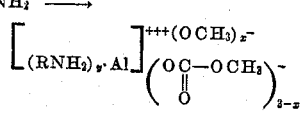

where $x$ is a value of from 0 to and including 3. Note, $x$ is never greater than the valency of the metal, in this instance aluminum, which is 3.

Again, the most heat stable form corresponds to

[(RNH$_2$)$_y$·Al]$^{+++}$(OCH$_3$)$_3^-$ where $y$ is a whole number including 1 through 4.

As illustrated in the above examples, the temperature of formation of the co-ordinated metal rosinamine complex salts does not appear to be critical. However, the carbon dioxide of the complex appears to be loosely held. Heating of the formed complexes at elevated temperatures for extended periods of time leads to complete liberation of the carbon dioxide of the complex. Note that the fully co-ordinated 4 mol rosinamine: 1 mol magnesium was stable only up to about 90° C. The described compounds may be readily formed at room temperatures, and as observed, the higher co-ordination compounds are less stable to heat. The order of addition in preparing the higher molal ratios of rosinamine to the metal methyl carbonate is important, but in the case of the lower molecular weight co-ordination compounds, e. g., 1:1 ratios, they may be formed by merely blowing admixtures of metal methyl alcoholate and rosinamine with carbon dioxide, or alternatively by adding the rosinamine to the previously prepared metal methyl carbonate, or preferably by adding the prepared carbonate solution to the rosinamine. It has been found preferable first to prepare the metal methyl carbonate and then to add the requisite quantity of the carbonate to a solution of rosinamine in a co-solvent for both reactants. Co-ordination does not occur at room temperature in the absence of methyl alcohol. However, it is believed that the methanol merely acts as a co-solvent and there has been no observed evidence to indicate co-ordination of the methoxide group with the metal. Obviously then, other solvents, and particularly those of a polar nature, may be expected to replace methyl alcohol as to the portion thereof which acts merely as a co-solvent for the co-ordination reaction.

The compounds of this invention were found to be insoluble in water and ethyl alcohol and to be compatible with mineral spirits, xylol, toluol and ethyl acetate with the exception of a very slight haze being present.

Incorporation of the complexes of this invention in paint system is best accomplished by their incorporation in the initial pigment-vehicle pastes prior to the grinding or pigment dispersion step.

Having illustrated our invention by representative examples of its reduction to practice, what we claim and desire to protect by Letters Patent is:

1. A method of manufacture of a co-ordinated rosinamine complex of the general structure;

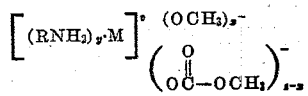

where R is a residue of a primary rosinamine, M is a material selected from the group consisting of magnesium and aluminum, $y$ is a whole number including 1 through 4, $z$ is the valency of the metal M, when M is aluminum $x$ is a value of 2 to 3 and when M is magnesium $x$ is a value of 1 to 2, and $v$ is the number of positive charges associated with the cation and equivalent in numerical value to $z$, which comprises intimately admixing one mol of the selected metal methoxy carbonate with from 1 to 4 mols of a primary rosinamine in the presence of a co-solvent therefor.

2. As in claim 1 where the metal is magnesium.
3. As in claim 1 where the metal is aluminum.
4. A co-ordination compound of the structure:

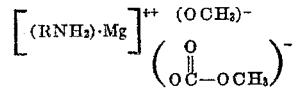

where R is a primary rosinamine residue.

5. A co-ordination compound of the structure:

[(RNH$_2$)·Mg]$^{++}$(OCH$_3$)$_2^-$ where R is a primary rosinamine residue.

6. A co-ordination compound of the structure:

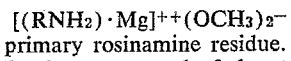

where R is a primary rosinamine residue.

7. A co-ordination compound of the structure:

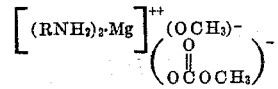

where R is a primary rosinamine residue.

8. A co-ordination compound of the structure:

[(RNH$_2$)$_4$·Mg]$^{++}$(OCH$_3$)$_2^-$ where R is a primary rosinamine residue.

9. A co-ordination compound of the structure:

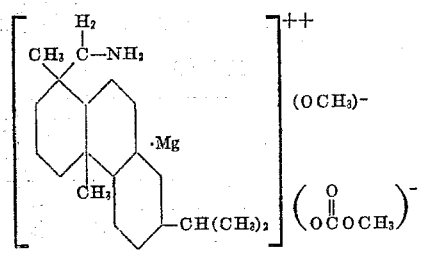

References Cited in the file of this patent

UNITED STATES PATENTS

| | | |
|---|---|---|
| 2,356,161 | Iler | Aug. 22, 1944 |
| 2,359,826 | Campbell | Oct. 10, 1944 |
| 2,419,404 | Johnson | Apr. 22, 1947 |